United States Patent Office.

JOHN VEDDER RIGGS, OF AMSTERDAM, NEW YORK.

MEDICINAL AERATED WATER.

SPECIFICATION forming part of Letters Patent No. 343,344, dated August 31, 1886.

Application filed May 15, 1886. Serial No. 202,331. (No specimens.)

*To all whom it may concern:*

Be it known that I, JOHN VEDDER RIGGS, a citizen of the United States, residing at Amsterdam, in the county of Montgomery and State of New York, have invented a new and useful composition of matter to be used as a medicine or as a medicinal table-water, of which the following is a specification.

My composition consists of the following ingredients, combined as hereinafter stated, namely: potable water, oxygen gas, and nitrogen-monoxide gas. These ingredients must be thoroughly mingled and united by pressure and agitation, then passed into any suitable package or vehicle (commonly used for such purposes) which will retain the pressure and gases in the water until the contents are used by the consumer.

To manufacture the above composition it is necessary that the water employed shall be a good potable water, preferably a filtered or distilled water, the two gases to be produced according to the methods given in works on chemistry, and rendered chemically pure. The water is placed in any one of the common form of compressors, agitators, or fountains in use by all manufacturers of soda-water or carbonated beverages. Then by any suitable compression-pump the two gases are forced into and thoroughly agitated and united with the water until an attached pressure-gage shall indicate about one hundred and fifty pounds pressure to the square inch. I have determined that two volumes of oxygen gas with one of nitrogen-monoxide gas and one hundred and fifty pounds pressure give the best general result, yet these proportions of gases and amount of pressure may be varied somewhat without detracting from the good results of the composition.

I am aware that water charged with oxygen gas has been used heretofore, and also that water charged with nitrogen monoxide has been similarly used; and I am aware that both oxygen and nitrogen monoxide in gaseous mixture is now being used for inhalations into the respiratory organs of the body, but I am not aware that the combination of both oxygen and nitrogen monoxide with water to be introduced into the stomach as a medicine, and for which I make my claim, has ever been used or manufactured. By my composition I produce a medicine vastly superior to a product composed of water and either gas singly, by virtue of its success in covering a much larger field of therapeutic action and increased good results of medicinal effects. Nitrogen-monoxide gas, being a congener of oxygen, does not interfere with the medical properties of the latter gas, but does add largely to its good results as a remedy in disease, most especially in nervous ailments, in which it stands pre-eminently superior to oxygen gas.

What I claim, and desire to secure by Letters Patent of the United States, is—

The herein-described composition or compound of matter to be used as a medicine and table-water, consisting of potable filtered or distilled water, oxygen gas, and nitrogen-monoxide gas, combined as specified.

JOHN VEDDER RIGGS.

Witnesses:
JNO. K. WARRICK,
W. MAX REID.